(12) United States Patent
Gilboa et al.

(10) Patent No.: US 11,551,517 B2
(45) Date of Patent: Jan. 10, 2023

(54) COMPUTERIZED GAMING SYSTEM AND METHOD OF OPERATING THEREOF

(71) Applicant: Playtech Software Limited

(72) Inventors: Eran Gilboa, Gibraltar (GI); Eyal Narkiss, Cliffside Park, NJ (US); Offer Ben Mordechai, Gibraltar (GI); Yevhenii Stanishevskyi, Kyiv (UA); Aleksei Loos, Tartu (EE)

(73) Assignee: Playtech Software Limited, London (GB)

( * ) Notice: Subject to any disclaimer, the term of this patent is extended or adjusted under 35 U.S.C. 154(b) by 0 days.

(21) Appl. No.: 17/003,415

(22) Filed: Aug. 26, 2020

(65) Prior Publication Data

US 2021/0065502 A1 Mar. 4, 2021

Related U.S. Application Data

(60) Provisional application No. 62/925,256, filed on Oct. 24, 2019, provisional application No. 62/891,534, filed on Aug. 26, 2019.

(51) Int. Cl.
*G07F 17/32* (2006.01)

(52) U.S. Cl.
CPC ...... *G07F 17/3239* (2013.01); *G07F 17/3255* (2013.01)

(58) Field of Classification Search
CPC .............. G07F 17/32–34; G07F 17/3239
See application file for complete search history.

(56) References Cited

U.S. PATENT DOCUMENTS

| | | | |
|---|---|---|---|
| 2009/0054134 A1* | 2/2009 | Jackson | G07F 17/3258 463/25 |
| 2011/0045892 A1* | 2/2011 | Vann | G07F 17/34 463/20 |
| 2011/0319169 A1* | 12/2011 | Lam | A63F 13/63 463/42 |
| 2013/0190081 A1 | 7/2013 | Naik et al. | |
| 2014/0148249 A1* | 5/2014 | Hausler | G07F 17/3244 463/25 |
| 2014/0274317 A1 | 9/2014 | Mcdonald et al. | |
| 2015/0099575 A1* | 4/2015 | Elias | G07F 17/3267 463/25 |
| 2015/0126282 A1 | 5/2015 | Hitomi et al. | |

* cited by examiner

*Primary Examiner* — Jasson H Yoo
(74) *Attorney, Agent, or Firm* — Browdy and Neimark, P.L.L.C.

(57) ABSTRACT

In a gaming environment including an aggregation platform, remote game servers (RGS) and Gaming Platform as a Service (GPAS), a method for operating an aggregation platform in a gaming environment. The method including associating a player with tokens and features, where the tokens are usable to acquire the features, monitoring operation of the player with the tokens in the games, and determining operation of Features in the games, based upon the operation of the player with the tokens.

8 Claims, 3 Drawing Sheets

COMPUTERIZED GAMING SYSTEM AND METHOD OF OPERATING THEREOF

TECHNICAL FIELD

The presently disclosed subject matter relates to computerized gaming systems and more particularly to operating Features in computerized gaming systems, and methods thereof.

BACKGROUND

The industry of computerized games is in the process of taking on a new shape, from providing traditional boxed products, toward providing games using service-oriented platforms, in a model of operation referred to as a "Game as a service (GaaS)". In the GaaS model, the actual game software can be stored on the hosting company's servers and streamed to the player's device as cloud gaming services on a subscription basis of the player. Traditionally, all data relating to the player and the player's activity in the game is stored on the user's computer. The GaaS model, providing cloud gaming services, involves technologies relating to how games are developed, deployed, and maintained, including monitoring a player's activity in the gaming system's level, and providing advanced game functionalities based on the player's activity.

Similar to other cloud computing services, cloud gaming services have many advantages compared to traditional gaming systems, such as scalability, ubiquitous and cross-platform support for providing an immersive gaming experience, cost effectiveness for system development, software distribution, etc. One of the advantages of the GaaS model is that GaaS augments the accessibility of games to players and allows them to play multiple games without installing them. However, this availability involves technological challenges relating to tracking data related to the user's activity during the various games, and consolidating this data at the gaming systems' end. Specifically, the gaming system needs to provide ability to effectively manage users' activity involving real time data tracking and deployment, supporting actions relating to instant approval and distribution of microtransactions, maintain subscription billing, and more.

GENERAL DESCRIPTION

According to one aspect of the presently disclosed subject matter here is provided a method of operating an aggregation platform, comprising:

providing an aggregation platform operatively communicating with at least one remote game server (RGS), the aggregation platform further operatively communicating with a Gaming Platform as a Service (GPAS), the at least one RGS and the GPAS are configured for hosting a plurality of games to be provided to a plurality of players, the GPAS is further configured for communicating with the aggregation platform data pertaining to tokens balance and/or Features balance, both associated with a player, and to provide data received from the aggregation platform to the player, wherein the tokens are usable by the player to acquire one or more Features from a list of available Features, wherein each of the Features has a respective predefined cost value in terms of a number of tokens, and wherein each Feature is operable in a game, depending on a Feature's stake value associated with the respective Feature, the method comprising:

by a processor of the aggregation platform, with respect to each player of the plurality of players:
associating the player with a tokens balance comprising one or more tokens;
associating the player with a Features balance comprising one or more Features, the Features have been acquired by the player, wherein each Feature is associated with a respective Feature's stake value;
transmitting the associated tokens balance and the Features balance to the GPAS, and
repeatedly monitoring operation of the player, including:
in response to receipt from the at least one RGS or the GPAS data on game events generated in one or more the plurality of games, continuously updating the tokens balance according to a predefined configuration;
receiving from the GPAS a selection by the player of a Feature from the list of available Features, wherein the Feature is operable in a given game;
updating the tokens balance, based on the selection, by degrading the number of Feature's cost value;
wherein the updated tokens balance over a selected time interval or portion thereof constitutes a token balance trail;
determining a Feature's stake value of the selected Feature, based on the updated tokens balance trail, and associating the selected Feature with the determined Feature's stake;
adding the selected Feature to the Feature's balance, thereby enabling operation of the selected Feature in the given game, according to the feature's stake.

In addition to the above features, the method according to this aspect of the presently disclosed subject matter can optionally comprise one or more of features (i) to (vii) below, in any technically possible combination or permutation:

i. wherein the method further comprising:
transmitting the updated Feature's stake to the GPAS to be communicated to the player; and
receiving, from the GPAS, data on activation of the selected Feature in the given game.

ii. wherein a Feature of the available Features is selected from a group comprising the following: game, in-game options, and out-game options.

iii. wherein associating the player with the tokens balance comprises:
generating at least two types of tokens;
associating the player with at least two separate tokens balances per each token type; and
in response to receipt from the at least one RGS or the GPAS of the data on game events, continuously updating the balance of a first token type, and not updating the balance of the second token type.

iv. wherein one or more Features of the list are acquirable only by one or more predefined types of tokens.

v. wherein predefined cost value of a Feature may vary, depending on a type of tokens of the at least two types of tokens, and/or a combination thereof.

vi. wherein the method further comprising:
providing a licensee operating a game hosted on the at least one RGS of the GPAS, the licensee is configured to release one or more tokens of one or more token types to the player, wherein the method further comprises:

in response to receipt from a licensee data indicative of a release of one or more tokens of one or more tokens types, updating the respective tokens balance.

vii. wherein at least one token type is a promotional token type, each promotional token type having a monetary value, wherein, in response to receipt from the licensee data indicative of the release of one or more tokens of promotional tokens types, updating the respective promotional tokens balance.

According to another aspect of the presently disclosed subject matter there is provided a non-transitory computer readable storage medium tangibly embodying a program of instructions that, when executed by a computer, cause the computer to perform a method of operating an aggregation platform, comprising:

providing an aggregation platform operatively communicating with at least one remote game server (RGS), the aggregation platform further operatively communicating with a Gaming Platform as a Service (GPAS), the at least one RGS and the GPAS are configured for hosting a plurality of games to be provided to a plurality of players, the GPAS is further configured for communicating with the aggregation platform data pertaining to tokens balance and/or Features balance, both associated with a player, and to provide data received from the aggregation platform to the player, wherein the tokens are usable by the player to acquire one or more Features from a list of available Features, wherein each of the Features has a respective predefined cost value in terms of a number of tokens, and wherein each of the Features is operable in a game, depending on a Feature's stake value associated with the respective Feature, the method comprising:

by a processor of the aggregation platform, with respect to each player of the plurality of players:
  associating the player with a tokens balance comprising one or more tokens;
  associating the player with a Features balance comprising one or more Features, the Features have been acquired by the player, wherein each Feature is associated with a respective Feature's stake value;
  transmitting the associated tokens balance and the Features balance to the GPAS, and
  repeatedly monitoring operation of the player, including:
    in response to receipt from the at least one RGS or the GPAS data on game events generated in one or more of the plurality of games, continuously updating the tokens balance according to a predefined configuration;
    receiving from the GPAS a selection by the player of a Feature from the list of available Features, wherein the Feature is operable in a given game;
    updating the tokens balance, based on the selection, by degrading the number of the Feature's cost value;
    wherein the updated tokens balance over a selected time interval or portion thereof constitutes a token balance trail;
    determining a Feature's stake value of the selected Feature, based on the updated tokens balance trail and associating the selected Feature with the determined Feature's stake;
  adding the selected Feature to the Feature's balance, thereby enabling operation of the selected Feature in the given game, according to the feature's The method and the non-transitory computer readable storage medium disclosed herein according to various aspects, can optionally further comprise one or more of features (i) to (vii) listed above, mutatis mutandis, in any technically possible combination or permutation.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

Figure 1:
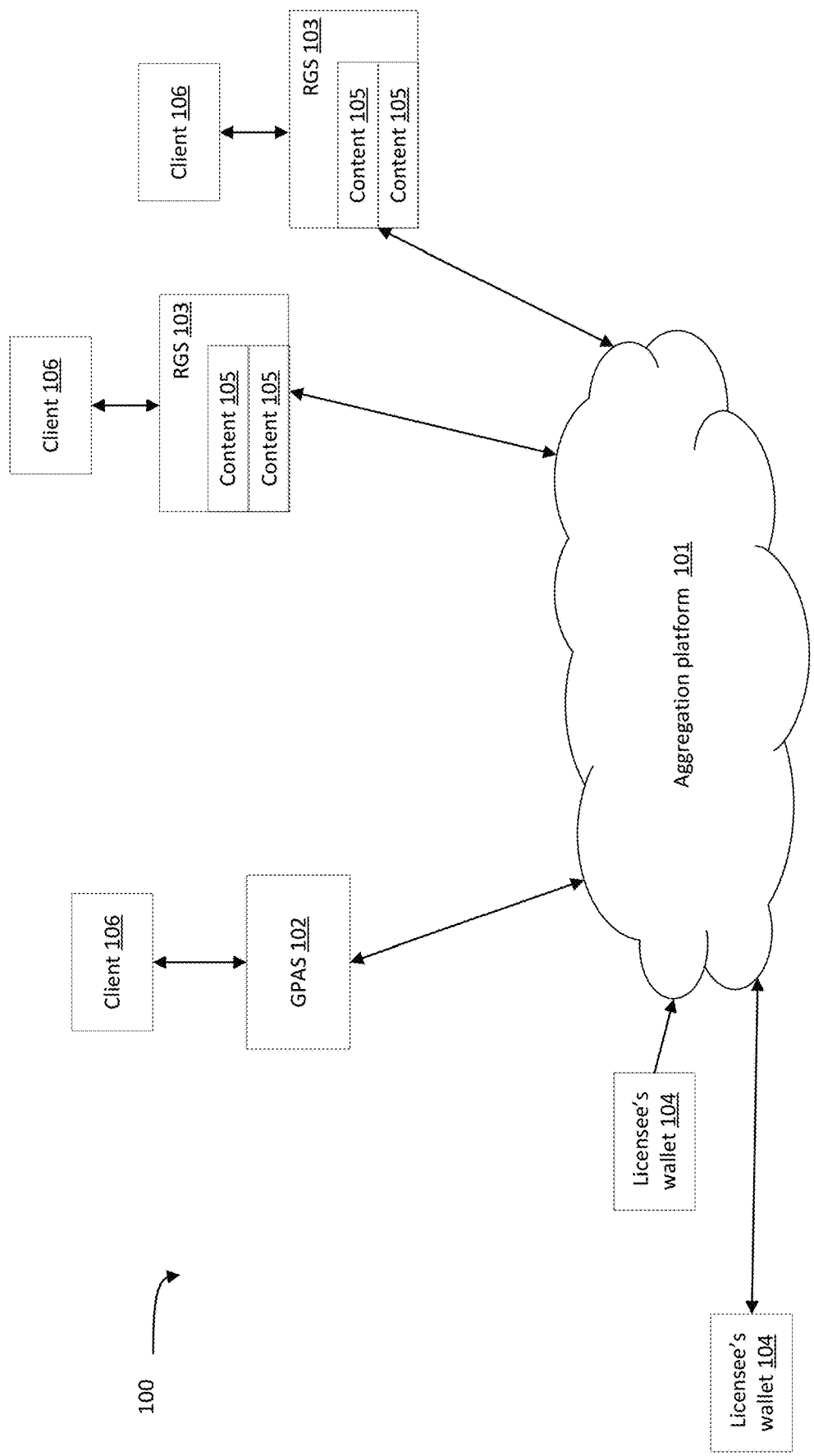
FIG. 1 shows a high-level illustration of a computerized gaming environment 100 in accordance with certain embodiments of the presently disclosed subject matter.

As apparent from the following discussions, and unless specifically stated otherwise, it is appreciated that throughout the specification discussions utilizing terms such as "providing", "communicating", "hosting", "using", "acquiring", "associating", "transmitting", "monitoring", "updating", "calculating", "using", "transmitting", "generating", "adding", "maintaining" or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the gaming system disclosed in the present application.

The operations in accordance with the teachings herein may be performed by a computer specially constructed for the desired purposes, or by a general-purpose computer specially configured for the desired purpose by a computer program stored in a non-transitory computer-readable storage medium.

According to certain embodiments of the presently disclosed subject matter, gaming environments involve a large number of separate entities, operating and communicating through a complex network and architecture. Content, such as games, are created by a content creator or content provider, and are stored on Remote Gaming Servers (RGSs) around the world. A game can be stored on more than one RGS. A licensee of a casino, also to be referred to herein as an operator, can choose to operate one or more games by adding them to the operator's portfolio, while the games themselves are stored on a single RGS or multiple RGSs. Operation of the games is subject to various dynamic parameters and configurations, some of which are dictated by local legislation and some being determined or structured by the content creator, the licensee operator, or the RGS itself. In addition, the games can communicate with external systems, such as backend and management systems of the licensee operators, player management systems, various analytic systems, and wallet management systems. In order to provide GaaS mode of operation in a smooth manner, a gaming system needs to constantly track a player's activity during the various games and provide the required gaming functionalities. As such, there is a constant communication of data pertaining to the content stored on a particular RGS, e.g. the games, between entities operating in the network.

Tracking the user's activity in several games hosted by RGSs, and aggregating the data at a higher level than the RGSs hosting the particular games, enables the entity that aggregates the data, to provide additional services to the player, which may be spread to several games, e.g. to games belonging to a specific suit of games. Also, the data gathered in one game, including the user activity and betting in one game, can be used to provide services in another game, or provide advanced services to game operators.

According to certain embodiments of the presently disclosed subject matter, the gaming system can provide the player with Features, e.g. in-game options and/or out-game options, to be operated in games, based on the player's activity in other games. In order to do so, the gaming system can monitor and aggregate data pertaining to the player's activity in one or more games hosted by RGSs. The aggregated data includes data on game events generated in the games. Based on the aggregated data, the gaming system can determine how to operate a Feature that is provided to the player.

Bearing this in mind, attention is drawn to FIG. 1 illustrating a generalized diagram of a computerized gaming environment 100 in accordance with certain embodiments of the currently presented subject matter.

An aggregation platform 101 is operatively connected to one or more Remote Gaming Servers (RGSs) 103 each hosting one or more content pieces 105, e.g. games. The aggregation platform 101 is also operatively connected to one or more additional RGSs, denoted by GPAS 102, configured in accordance with certain embodiments of the currently presented subject matter. The aggregation platform 101 is further operatively connected to several instances of licensee's wallet systems denoted as 104.

In some examples, the aggregation platform 101 is configured to aggregate RGSs from different providers and enable a unified point of integration to licensees. GPAS 102 is configured to communicate with aggregation platform 101 as an RGS e.g. via TPI (Third Party Interface) protocol, as defined by a TPI Specification published by the Gaming Standards Association). GPAS 102 can be further configured to enable the GaaS-mode of operation and is referred to hereinafter as GPAS (Gaming Platform as a Service). GPAS 102 can be configured to enable all necessary game management functions (e.g. executing and resolving game logic, game flows, error flows, regulation requirements, etc.). It can be also configured to provide front-end technologies (e.g. games development kit (GDK)) as well as to generate and deliver game clients to players' browsers. GPAS allows games to be authored once and deployed into multiple channels (e.g. enables omni-channel content delivery to desktop, mobile, casino and/or retail environment).

In some cases, aggregation platform 101 is configured to provide a player with tokens to be used in game operation. Tokens can be considered as a shared currency between the games. In some examples, tokens can be generated by the games. In some examples, tokens can be generated in one game, and be spent by the player, in another game. In some examples, the currency, e.g. the tokens, can also be generated outside of the games, e.g. by a licensee of the game. In some cases, tokens can be used by the player to acquire Features. Aggregation platform 101 is configured to provide the player with one or more Features to be operated in the plurality of games. The term "Feature" should be expansively construed to cover any kind of game, in-game options and/or out-game options defined as acquirable by tokens.

The term "Feature" includes games and/or options that can be triggered with and/or without spending tokens. For example, the Features can be in-game options and/or out-game options, such as pick bonus or free game. Each Feature has a respective predefined cost value in terms of a number of tokens. For example, the predefined cost value of a Feature can be the Feature cost, i.e. the number of tokens required to acquire the Feature (fCost). In addition, each Feature is further characterised by a Feature's stake (fStake) value. A Feature's stake value represents the total bet of the player in the games. A Feature's stake value is determined at the time of a feature acquisition, based on the history of bids of the player. The Feature's stake is used during a Feature operation, in accordance with Feature logic. For example, if the Feature is free games, then Feature Stake is total bet per free games' spin. If Feature is a pick bonus, then Feature Stake is a value to be multiplied by the bonus item multiplier. Calculating determining a Feature's stake value is further described below with respect to FIG. 3. Traditionally, in known systems, a Feature is provided to a player, and can be operated in a single game played by the player. In such known systems, the Feature's stake is calculated based on the players activity in the single game and the pending token balance is dependent on the single game only. In some cases, according to the presently disclosed subject matter, aggregation platform 101 is configured to provide a player with Features to be operated in the plurality of games, based on activity of the player in the plurality of games, and based on token balance dependent on the plurality of games. Aggregation platform 101 is configured to aggregate data pertaining to players' activity in the plurality of games, and to determine the Feature's stake, based on activity in the plurality of games. Aggregating the data from the plurality of games and determining the Feature's stake based on the aggregated data enables aggregation platform 101 to provide to a player Features to be operated in the plurality of games. In some non-limiting examples, aggregation platform 101 is configured to aggregate data that pertains to the activity of a player in a plurality of games, and provide the player with a Feature to be operated in a new game, for which data on the user's activity was not received and aggregated by the aggregation platform 101.

Figure 2:
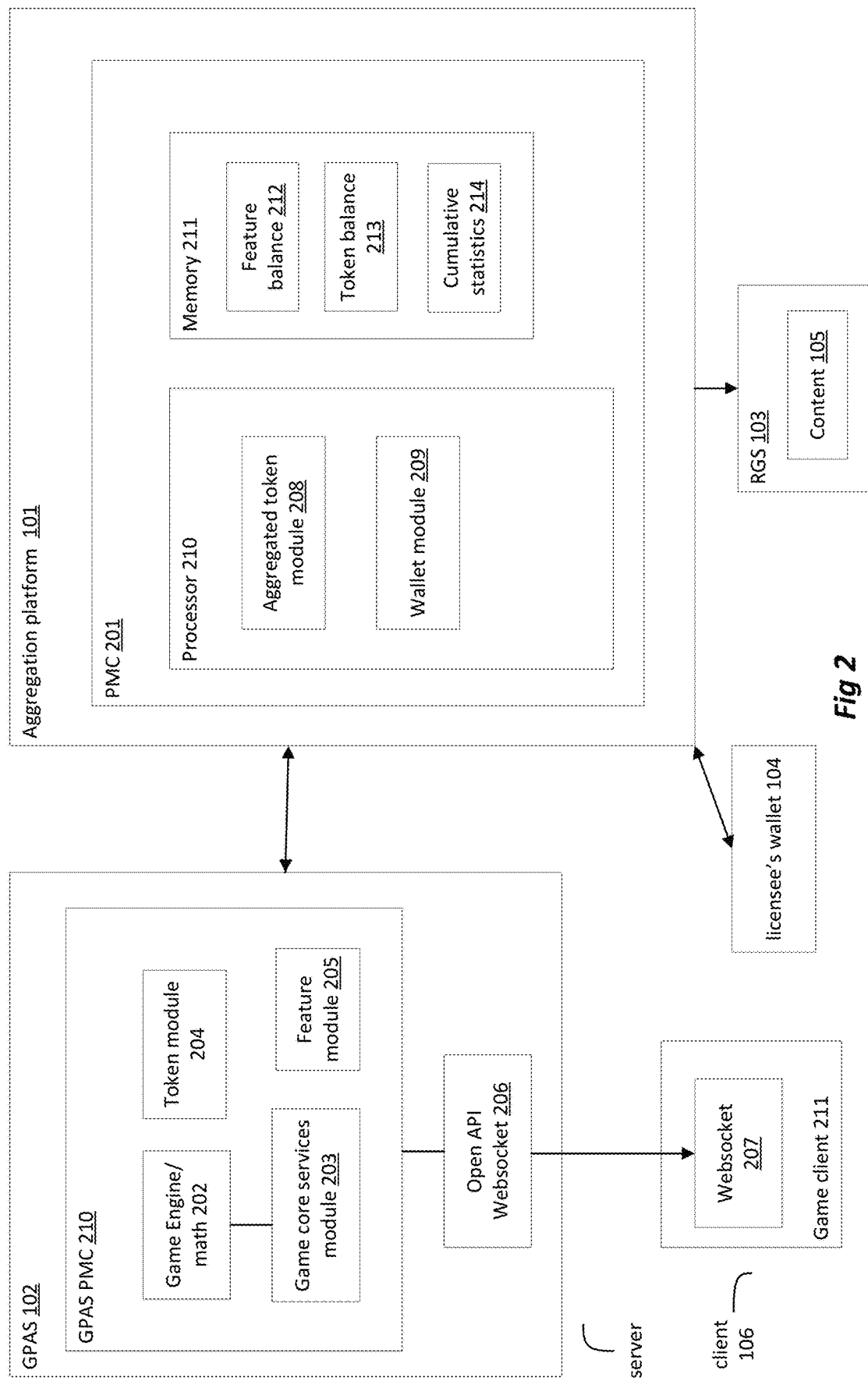
FIG. 2 illustrates a high-level functional block diagram of several entities in the gaming environment, in accordance with certain embodiments of the presently disclosed subject matter.

Referring to FIG. 2, there is illustrated a high-level functional block diagram of several entities in the gaming environment, in accordance with certain embodiments of the currently presented subject matter. Aggregation platform 101 is configured to enable operation of one or more Features in a plurality of games, based on a player's activity in the plurality of games. In some cases, aggregation platform 101 comprises a processor and memory circuitry (PMC) 201 comprising a processor 210 and a memory 211. The processor in PMC 201 is configured to execute several functional modules in accordance with computer-readable instructions implemented on a non-transitory computer-readable storage medium. Such functional modules are referred to hereinafter as comprised in the processor. The processor 210 can comprise aggregated token module 208, and wallet module 209. Memory 211 can store, for each player, Feature balance 212, tokens balance 213 and cumulative statistics 214. Feature balance 212, tokens balance 213 and cumulative statistics 214 are associated with a particular player and are dynamically updated, as will be explained with respect to FIG. 3.

In some cases, aggregation platform 101 can operatively be connected to GPAS 102. GPAS 102 is operatively coupled to one or more clients 106 configured to run one or more games clients 211. GPAS 102 can further be operatively coupled, directly or via platform 101, to licensee's wallet 104. GPAS 102 comprises a processor and memory circuitry (PMC) 210 comprising a processor and a memory (not shown separately). The processor in GPAS PMC 210 is configured to execute several functional modules in accordance with computer-readable instructions implemented on a non-transitory computer-readable storage medium. Such functional modules are referred to hereinafter as comprised in the processor of GPAS PMC 210. The processor of PMC GPAS 210 can comprise game engine/math 202, game core services module 203, token module 204 and Feature module 205. GPAS 102 is implemented on a server and comprises a hardware-based interface configured as an open API websocket, denoted by open API websocket 206, enabling communication with websocket 207 of a client 106. GPAS can be configured to operate both as a client and as a server. The client side, e.g. a game UI, is denoted by client 106. The server side, e.g. game engine/math 202 in GPAS 102 is denoted by GPAS 102 being a server. When a GPAS game client 211 runs in a browser at a client 106 side, it creates a connection to GPAS 102 server, e.g. to game engine/math 202 included in GPAS 102. Game engine/math 206 is operatively connected to game core services module 203. Game core services module 203 can comprise several service functional modules configured to provide core services necessary for hosting game engines (e.g. random number generation, game history service, state persistence service, message routing service, regulatory compliance services, etc.). A combination of a game client 211 with a Game Engine/match 202 configured to run on GPAS, constitutes a GPAS game and enables the GaaS mode of operation of GPAS 102.

In some cases, aggregation platform 101 is configured to enable operation of one or more Features in a plurality of games, based on player's activity in the plurality of games. In order to monitor a player's activity in the games, aggregated token module 208 included in PMC 201 is configured to associate a player with a tokens balance, for example, when the player places a new bet. Aggregated token module 208 is configured to transmit the associated tokens balance to the GPAS 102, e.g. to token module 204. Token module 204 is configured to provide token services to client 106, including e.g. displaying the tokens balance to the client and generating new tokens based on token math as stipulated e.g. by game engine/math 202. The tokens are usable by the player in plurality of games hosted by the RGSs 103 and the GPAS 102, for example to acquire Features to be operated in the plurality of games.

Aggregated token module 208 is configured to update the token balance, based on data on game events received at aggregation platform 101. Hence, in response to receipt from one or more RGSs, or the GPAS data on game events generated in games, aggregated token module 208 is further configured to dynamically update the tokens balance, according to a predefined gaming configuration. Game events can include for example, a new player started to play, a new bet was placed by an existing player, a new game has been started by the player, in-game event such as winning a certain payout size, triggering a specific in-game bonus free game or receiving no wins for a number of game rounds, a licensee operating a game activated a promotional event, scheduled event and predefined money deposit. The predefined configuration can include configuration relating to allocating new tokens or decreasing a number of tokens when any of the above events occur.

In some examples, the tokens balance in aggregated token module 208 in aggregation platform 101 is updated in response to receipt of game events from the plurality of RGSs or the GPAS, and hence, it is aggregated across multiple games and RGSs. The updated tokens balance over a selected time interval or portion thereof constitutes a token balance trail.

In some examples, the updated tokens balance is sent to the GPAS 102, e.g. to token module 204 to provide the updated tokens balance to the user, for example by displaying it to the player. Optionally, token module 204 generates new tokens.

In some cases, PMC 201 is further configured to associate a player with one or more Features. Some examples of Features include a game, in-game options, and out-game options. Features can be acquired by the tokens, wherein each Feature can have respective predefined cost value in terms of a number of tokens, and wherein each of the Features is operable in a game. The operation of the Feature in a game is dependent on a Feature's stake value associated with the respective Feature. As mentioned, the Feature's stake value is a total bet calculated by the wallet module 209, and usable during a Feature operation at client 106, in accordance with Feature logic. Usage of the Feature Stake is specified by Feature math.

The player can acquire a desired Feature, by selecting a Feature from one or more available Features provided by aggregation platform 101, and displayed to the player by GPAS 102. In some examples, the updated tokens balance over a selected time interval or portion thereof constitutes a token balance trail. The trail represents the player's activity in the games, including e.g. the bets of the player in the games in a time interval. Wallet module 209 is configured to calculate a player's statistics upon selection of the Feature by the player, based on the token's balance trail of the player. The calculated player's statistics can then be used to determine a Feature's stake value of the Feature selected by the player, and associating the selected Feature with the determined Feature's stake, thereby enabling operation of the selected Feature a game. The calculation of the Feature's stake is further described below with respect to FIG. 3.

It is noted that the teachings of the presently disclosed subject matter are not bound by the aggregation platform 101 or the GPAS 102 described with reference to FIGS. 1 and 2. Equivalent and/or modified functionality can be consolidated or divided in another manner and can be implemented in any appropriate combination of software with firmware and/or hardware and executed on a suitable device. In certain embodiments, aggregation platform 101 and/or GPAS 102 can be implemented in multi-tenancy clustered architecture so that multiple instances of each server component run across multiple server nodes, providing both resilience and scalability.

Figure 3:
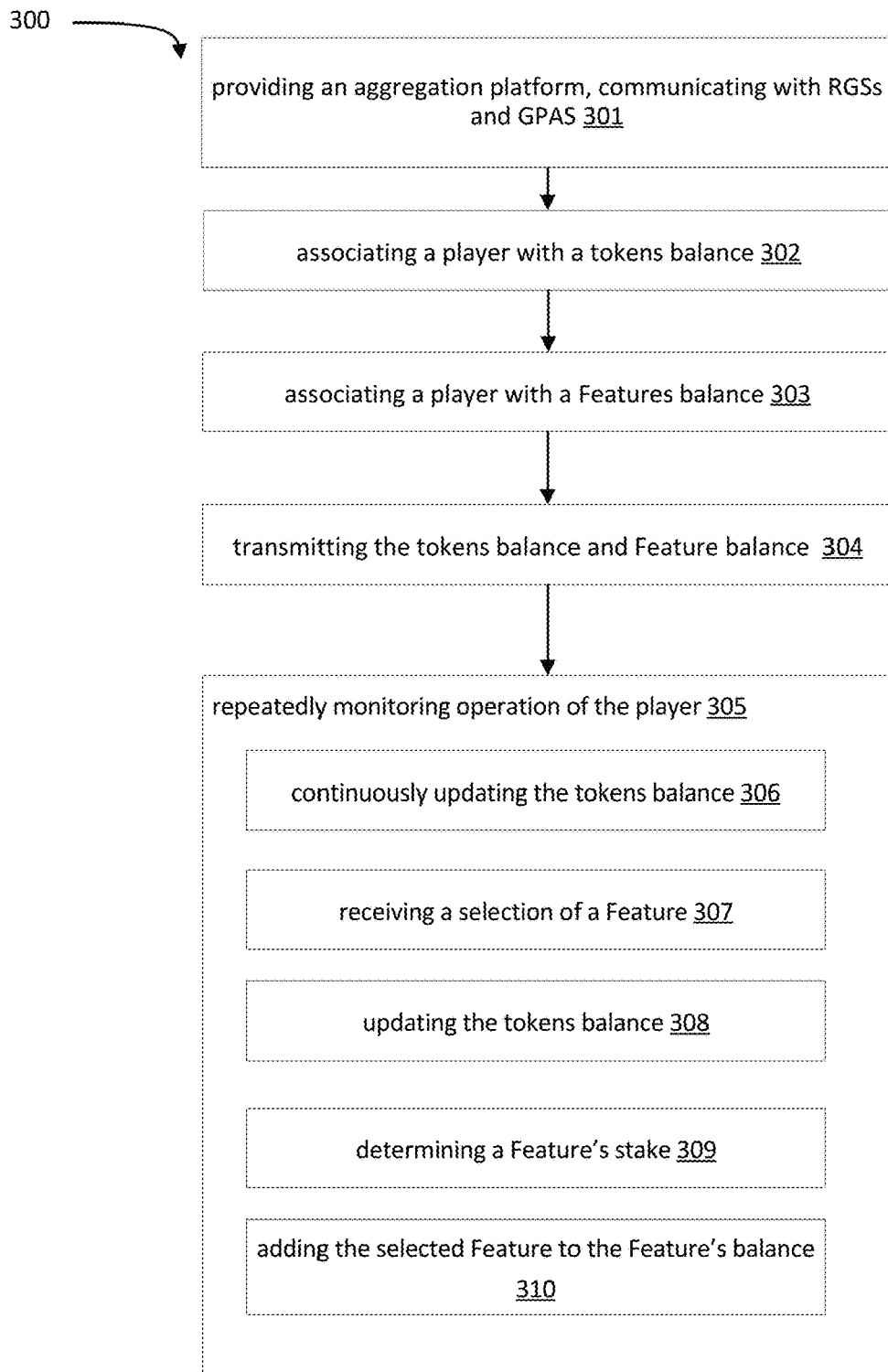
FIG. 3 illustrates a general flowchart of operations performed in platform 101, in accordance with certain embodiments of the presently disclosed subject matter.

Referring to FIG. 3, there is illustrated a general flowchart of operations performed in aggregation platform 101, in accordance with certain embodiments of the presently disclosed subject matter.

In some cases, an aggregation platform 101 is provided. The aggregation platform 101 operatively communicates with at least one remote game server (RGS) 103. The aggregation platform 101 further operatively communicates with a Gaming Platform as a Service (GPAS) 102. Both the RGS 103 and the GPAS 102 are configured for hosting a plurality of games to be provided to a plurality of players (block 301). The GPAS 102 operates as an RGS and provides GaaS mode of operation. In some examples, the GPAS 102 exchanges data with aggregation platform 101 that pertains to the activity of the player in a game. Hence, the GPAS communicates with the aggregation platform 101 data pertaining to tokens balance and/or Features balance, both associated with a player, and provides data that is received from the aggregation platform 101 to the player. For example, aggregation platform 101 can send tokens balance or update to tokens balance to GPAS 102, and GPAS 102 can display the tokens balance to the player. Aggregation platform 101 can further send data on Features balance to the GPAS 102. The Feature balance can include one or more Features acquired by the player from a list of available Features provided to the player. In some examples, aggregation platform 101 provides a list of available Features. The list comprises one or more Features to be acquired by the player. Each of the one or more Features has a respective predefined cost value in a number of tokens. The player can acquire Features by selecting one or more from the list of available Features. The list can be provided e.g. by wallet module 209.

In addition, GPAS 102 can send data on game events generated in the games to aggregation platform 101. As mentioned above, game events can include, for example, a new player started to play, a new bet was placed by an existing player, a new game has been started by the player, in-game event a licensee operating a game activated a promotional event, scheduled event and predefined money deposit.

In some cases, the tokens can be used by the player in a plurality of games, for example to acquire one or more Features from a list of available Features. In some examples, aggregation platform 101 provides the player, e.g. through GPAS 102, a list of available Features for acquisition. Each of the Features has a respective predefined cost value in terms of a number of tokens. For example, the predefined cost value of a Feature can be the Feature cost in a number of tokens required to acquire the Feature (fCost). In some examples, the predefined Feature cost may vary, e.g. upon determining of a limited time discount for all Features. In cases where more than one type of token was generated, the predefined cost value of a Feature may vary, depending on the type of tokens, and/or a combination thereof.

In addition, each Feature is further characterised by a Feature's stake (fStake) value. A Feature's stake value represents the total bet of the player in the games. A Feature's stake value is determined at the time of a feature acquisition, based on the history of bids of the player. For example, if the Feature is free games, then Feature Stake is total bet per free games' spin. If Feature is a pick bonus, then Feature Stake is a value to be multiplied by the bonus item multiplier. Usage of the Feature Stake is specified by Feature math. The list of available Features for acquisition includes one or more Features available for acquisition by the player, where each Feature has a respective predefined cost value. Upon acquisition of one of the Features by the player, the Feature's stake is determined. Based on the determined Feature's stake, the Feature is operated in a game. The process of determining the Feature's stake is further described below.

In some cases, the processor 210 of the aggregation platform 101 executes the following steps, with respect to each player of the plurality of players:

The processor 210 associates a player with a tokens balance comprising one or more tokens (block 302). Processor 210 can transmit associated balance to token module 204 in GPAS 102, which can generate tokens to the player, based on the received tokens balance. The tokens can be generated to the player, e.g. by token module 204 in GPAS 102 e.g. responsive to gaming configuration. Once generated, the tokens in the tokens balance can be associated with the player. As mentioned above, game configuration can include predefined game events such as new player, new bet, new game, in-game event, promotional event, scheduled event, certain money deposit.

The tokens can be generated automatically and/or in response to a player's purchasing thereof. In some examples, processor 210 generates at least two types of tokens. The player is then associated with at least two separate tokens balances per each token type, respectively. In some examples, in response to receipt from the at least one RGS or the GPAS of the data on game events, processor 210 continuously updates the balance of a first token type, and does not update the balance of the second token type. Associating the token balance can be done e.g. by wallet module 209. The tokens balance can be stored e.g. in token balance 213 in memory 211.

For purpose of illustration only, the following description of tokens and updating tokens balance is provided for gaming systems configured to enable spin-based games. Those skilled in the art will readily appreciate that the teachings of the presently disclosed subject matter are, likewise, applicable to gaming systems configured to enable other games using RTP-based math (e.g. baccarat, lottery, poker, bingo, scratch card game, wheel of lucks, etc.)

By way of non-limiting example, each given player can be associated with three different types of tokens that are maintained by wallet module 209: game tokens (GTs), pending game tokens (PGTs) and promotional tokens (PTs). Accordingly, processor 210 can associate each given player with three separate balances per each token type. Optionally, processor 210 associates and transmits all three balances to GPAS 102, while GPAS 102 determines to display only the balances of GTs and PTs to the player, and determines to present the balance of PGTs to a licensee.

In some examples, the processor 210 associates with a player a random number, based on an outcome of a random number generator (less than a predefined max number) of GTs on every bet the player places in the game. Optionally, processor 210 associates with a player a random number of GTs responsive to other predefined game events. Optionally, each number of provided GTs can have an associated weight. By way of non-limiting example, depending on the number of provided GTs, the weight can decrease with increase of the number of provided game tokens. By way of alternative non-limiting example, depending on the number of provided GTs, the weight can increase by increasing the number of provided game tokens.

In some examples, the tokens can be displayed to the player. Following are non-limiting examples of a display. Processor 210 can randomly distribute the signs of provided GTs over the reels. Distribution of token signs on reels is defined by the math of the respective game. For example, the math can allow showing token signs only on certain reels, or restrict token signs on some symbols. Distribution and visualization of the provided GTs can be implemented in different ways. By way of non-limiting example, GT signs can appear as though they are coming from the reels together with symbols. Optionally, it can be possible to show several GT signs above the same symbol. By way of other non-limiting examples:

in a slot machine, special symbols or combinations of symbols can increase the number of GTs;
 in roulette, a designated sector can increase the number of GTs;
 in blackjack, a card value and/or suit can determine the number of collected GTs; etc.

Returning back to FIG. 3, in some cases, aggregation platform 101 further associates the player with a Features balance comprising one or more Features (block 303). The Feature balance includes the Features acquired by the player which are pending to be operated in a game. Each Feature is associated with a respective Feature's stake value, e.g. as determined when the Feature was acquired. Associating the Features balance can be done e.g. by wallet module 209. The Features balance can be stored e.g. in Features balance 212 in memory 211.

Processor 210 transmits the associated tokens balance and Features balance to the GPAS 102 (block 304). In some examples, token module 204 can receive token balance from wallet module 209 and display the token balance to the player. Feature module 205 can receive Features balance from wallet module 209 and display the Features balance to the player.

In some cases, processor 210 repeatedly monitors operation of the player (block 305). Monitoring the operation enables the aggregation platform 101 to provide usage of Features in a plurality of games, based on activity of the players in the games. Monitoring the operation of the Features can be done by the operations denoted in blocks 306-310. In response to receipt from at least one RGS or the GPAS data on game events generated in one or more of the plurality of games, processor 210 e.g. by Wallet module 209 continuously updates the tokens balance according to a predefined configuration (block 306). Unless specifically stated otherwise, it is appreciated that throughout the specification the terms "continuously updating" or the like refer to receiving (in push or pull mode) data substantially each time new data is available to aggregation platform 101 and/or responsive to predefined events (including scheduled events and events occurring in accordance with predefined periodicity). In some examples, updating the token balance includes upgrading or degrading the number of tokens in the tokens balance. In some examples, updating the tokens balance includes selectively updating the tokens balance, for example, when data on game events is received, but the tokens balance is not updated based on the received data on game events.

To continue with the examples in which more than one token type is generated, in some examples, processor 210 continuously updates the PGT tokens balance by generating and associating the player with PGT, e.g. every time it generates and associates the player with a GT. In some examples, the number of PGTs provided on a given spin is a function of GTs provided on the same spin. Optionally, a licensee operating a game hosted on the at least one RGSs of the GPAS, can release one or more tokens of one or more token types, e.g. PGT (within the current PGT balance), to the player. The licensee can release, responsive to predefined events (e.g. a new player, an existing player when starting a new game, depositing a specific amount of money, triggering an in-game Feature, etc.). In response, processor 210 updates the tokens balances by decreasing PGT tokens balance and increasing GT tokens balance by the number of released PGTs. Optionally, if the number of PGTs that a licensee wants to release exceeds PGTs balance, processor 210 can suggest completing the remaining amount with PTs, responsive to which the PT tokens balance is decreased.

It is noted that neither GTs nor PGTs are provided in connection with a Feature's operation. It is further noted that GTs and PGTs affect the RTP (return to player) of the underlying game. Accordingly, the game math is generated in accordance with the predefined weights of random numbers of generated GTs and the number of PGTs depending on the number of generated GTs. Accordingly, the respective tokens' balances are continuously updated.

Yet another example of updating the tokens' balances of certain type of tokens, in some examples, the processor 210 further enables a licensee to credit to a player one or more Promotional Tokens (PT) characterized by a predefined monetary value and lifetime. Upon receipt of an indication of a licensee that release PT to a player, the PT tokens' balance is updated accordingly. It should be noted that unlike GTs or PGTs, PTs have underlying monetary value credited by a licensee, together with PTs. The money thus credited to a player is a function of a number of credited PTs and an estimated average Games' stake of a player. Thus, the PT can be also outside of game RTP.

As detailed above, the processor 210, e.g. using wallet module 209 separately maintains GT, PGT and PT balances. In some examples, the overall balance status of a player can be in a regular mode, or in a capped mode. A player starts in a regular mode. In this mode, all types of tokens are available. A player's overall balance moves to a capped mode when the total amount of GTs and PTs reaches a predefined cap. It is noted that a player does not necessarily move to a capped phase when the number of PGTs reaches a cap, but only if, after transferring PGTs to the GT balance, the number of GTs and PTs reaches a cap.

In capped mode, the player is not able to collect or receive any types of tokens until the total number of GTs and PTs becomes less than the cap and the player returns to the regular mode. The number of tokens is reduced when the player spends tokens to buy a Feature, and/or when some tokens expire. Optionally, the different tokens can be configured to have different consuming priority. By way of non-limiting example, GTs can have higher priority than PTs; within the same type, tokens with sooner expiry time can have a higher consuming priority.

As explained above, in the examples, more than one token type is generated and associated with the player. For example, the following tokens can be generated: GTs, PGTs, PTs tokens. In such cases, the player is associated with a separate tokens balance for per each token type. In some examples, in response to receipt from the at least one RGS or the GPAS data on game events of a player, wallet module 209 is configured to continuously update the balance of the first token type and does not update the balance of the second token type.

In some cases, wallet module 209 receives from the GPAS 102 a selection by the player, of a Feature from the list of available Features (block 307). The selected Feature is operable in a game. In some examples, the selected feature is operable in more than one game. Yet, in some examples, the selected Feature is operable in a new, given, game, for which data on game events was not received by the aggregation platform 101. Accordingly, aggregation platform 101 did not update the tokens balance based on game events that were generated in the given game.

In some cases, based on the selection, wallet module 209 updates the tokens balance and Features balance (block 308). In some example, updating the Feature's balance includes degrading the feature cost value of the number of tokens in the Feature's balance.

As explained, in response to receipt of data on game events, the tokens balance is continuously updated. In some examples, the tokens balance includes data indicative of previous updates made to the tokens balance, such that over a selected time interval or portion thereof, the updated tokens balance constitutes a token balance trail of the player and the player's activity in the games. For example, the token balance can include a list of all updates made to the token balance in response to receipt of game events, over a selected time interval or a portion thereof. Optionally, the number of bets and/or their amount can be obtained from the token balance trail. It should be noted that a selected time interval should not be considered as limiting, and the updated tokens balance can constitute a tokens balance trail over any time interval.

As described above, each Feature is characterized by a Feature cost in tokens (fCost) and by a Feature stake (fStake). Feature stake is a total bet aggregated and calculated by the processor 210 and usable during a Feature operation in a game, in accordance with Feature logic. In some cases, once a selection of a Feature is received, wallet module 209 determines a Feature's stake value of the selected Feature, based on the updated tokens balance trail, and associates the selected Feature with the determined Feature's stake (block 309).

In some examples, in order to determine a Feature's stake, processor first calculates cumulative statistics of the player, at the time of acquisition of the Feature by the player. Cumulative statistics are indicative of the activity of a player, in terms of the bets placed by the player. Following is a non-limiting example of cumulative statistics used by wallet module 209. Cumulative statistics of each given player include:

N—cumulative statistic that depends on a number of bets placed by a player, and

S—cumulative statistic that depends on a monetary sum of bets that are placed by a player.

The cumulative statistics can be stored e.g. in cumulative statistics 214 in memory 211.

The cumulative statistics are updated responsive to usage of the tokens balance. Optionally, if more than one type of tokens is generated, the cumulative statistics can be updated responsive to decrease of the GT balance. Yet, optionally, whenever game tokens balance decreases, either after expiry or buying a Feature, cumulative statistics are updated. The tokens balance trail over a selected time interval or portion thereof can be used to extract the above data for calculating the cumulative statistics.

By way of non-limiting example, once the cumulative statistics are calculated, processor 210 calculates Estimated Average Stake of a player, e.g. based on the cumulative statistics, the number of GT used to buy the Feature, the number and monetary value of PT used to acquire the Feature, and fCost of the Feature. In some examples, processor 210 determines a Feature's stake as a function of the calculated Estimated Average Stake of the Player. For example, the Feature's stake can be identical to the Estimated Average Stake. Alternatively, the Feature's stake can be a manipulation of the Estimated Average Stake. Thus, the Feature's stake, while having the same cast in the number of tokens, is variable, depending on a player's cumulative statistics. Thus, two Features can have an identical fCost but different fStake.

In some cases, once the Feature's stake is determined, wallet module 209 associates the selected Feature with the determined Feature's stake, and adds the Feature to the Feature's balance, thereby enabling operation of the selected Feature in the given game, according to the Feature's stake (block 310). In some examples, the selected Feature that was acquired by the player can be operated in a given game, for which data on game events was not received in aggregation platform 101, and, accordingly, tokens balance was not updated based on such data.

In some examples, processor 210 transmits the updated Feature's stake to the GPAS 102 to be communicated to the player. Feature module 205 can receive the updated Feature's balance and display it to the player. Upon activation of the Feature in the given game, GPAS 102 can send data on the game event indicative of activating the selected Feature in the given game.

It should be noted that aggregation platform 101 uses the same token balance for the plurality of games across the RGSs and GPAS, and calculates cumulative statistics based on the updated tokens balance trail. The calculated cumulative statistics are then used to determine a Feature's stake to be operated in a game. Using the same token balance for the plurality of games, and calculating the cumulative statistics not only enables a player to use his activity in one game to acquire a Feature in another game, but also involves a technological advantage in a reduced computational resources and time by tracking a single balance for each token type for all games, without the need to track balances for each game, and continuously updates the balances in response to game events, which are known to be frequent, in a large amount and in real time, in a gaming environment. Also, the cumulative statistics already consider the possibility of variable bets by the player in the same game, or across games, thus monitoring is manageable in a single balance, without losing data on the player's activity.

It is noted that the teachings of the presently disclosed subject matter are not bound by the flow charts illustrated in FIG. 3, and that the illustrated operations can occur out of the illustrated order. For example, operations 302 and 303, shown in succession, can be executed substantially concurrently, or in the reverse order. It is also noted that whilst the flow chart is described with reference to elements of system aggregation platform 101, this is by no means binding, and the operations can be performed by elements other than those described herein.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable memory tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of operating an aggregation platform, comprising:

providing an aggregation platform operatively communicating with at least one remote game server (RGS), the aggregation platform further operatively communicating with a Gaming Platform as a Service (GPAS), the at least one RGS and the GPAS are configured for hosting a plurality of games to be provided to a plurality of players, the GPAS is further configured for communicating with the aggregation platform data pertaining to tokens balance and/or Features balance, both associated with a player, and to provide data received from the aggregation platform to the player, wherein the tokens are usable by the player to acquire one or more Features from a list of available Features, wherein each of the Features has a respective predefined cost value in terms of a number of tokens, and wherein each Feature is operable in a game, depending on a Feature's stake value associated with the respective Feature, wherein the Feature's stake constitutes an Estimated average Stake or manipulation thereof; the method comprising:

by a processor of the aggregation platform, with respect to each player of the plurality of players:
associating the player with a tokens balance comprising one or more tokens;
associating the player with a Features balance comprising one or more Features, the Features have been acquired by the player, wherein each Feature is associated with a respective Feature's stake value;
transmitting the associated tokens balance and the Features balance to the GPAS, and
repeatedly monitoring operation of the player, including:
in response to receipt from the at least one RGS or the GPAS data on game events generated in one or more the plurality of games, continuously updating the tokens balance according to a predefined configuration;
receiving from the GPAS a selection by the player of a Feature from the list of available Features, wherein the Feature is operable in a given game;
updating the tokens balance, based on the selection, by degrading the number of Feature's cost value;
wherein the updated tokens balance over a selected time interval or portion thereof constitutes a token balance trail;
determining a Feature's stake value of the selected Feature, based on the updated tokens balance trail, and associating the selected Feature with the determined Feature's stake;
adding the selected Feature to the Feature's balance, thereby enabling operation of the selected Feature in the given game, according to the feature's stake;
transmitting the updated Feature's stake to the GPAS to be communicated to the player; and
receiving, from the GPAS, data on activation of the selected Feature in the given game.

2. The method of claim 1, wherein a Feature of the available Features is selected from a group consisting of the following: game, in-game options, and out-game options.

3. The method of claim 1, wherein associating the player with the tokens balance comprises:
generating at least two types of tokens;
associating the player with at least two separate tokens balances per each token type; and
in response to receipt from the at least one RGS or the GPAS of the data on game events, continuously updating the balance of a first token type, and not updating the balance of the second token type.

4. The method of claim 3, wherein one or more Features of the list are acquirable only by one or more predefined types of tokens.

5. The method of claim 3, wherein predefined cost value of a Feature may vary, depending on a type of tokens of the at least two types of tokens, and/or a combination thereof.

6. The method of claim 3, the method further comprising:
providing a licensee operating a game hosted on the at least one RGS of the GPAS, the licensee is configured to release one or more tokens of one or more token types to the player, wherein the method further comprises:
in response to receipt from a licensee data indicative of a release of one or more tokens of one or more tokens types, updating the respective tokens balance.

7. The method of claim 6, wherein at least one token type is a promotional token type, each promotional token type having a monetary value, wherein, in response to receipt from the licensee data indicative of the release of one or more tokens of promotional tokens types, updating the respective promotional tokens balance.

8. A non-transitory computer readable storage medium tangibly embodying a program of instructions that, when executed by a computer, cause the computer to perform a method of operating an aggregation platform, comprising:
providing an aggregation platform operatively communicating with at least one remote game server (RGS), the aggregation platform further operatively communicating with a Gaming Platform as a Service (GPAS), the at least one RGS and the GPAS are configured for hosting a plurality of games to be provided to a plurality of players,
the GPAS is further configured for communicating with the aggregation platform data pertaining to tokens balance and/or Features balance, both associated with a player, and to provide data received from the aggregation platform to the player,
wherein the tokens are usable by the player to acquire one or more Features from a list of available Features, wherein each of the Features has a respective predefined cost value in terms of a number of tokens, and wherein each of the Features is operable in a game, depending on a Feature's stake value associated with the respective Feature, wherein the Feature's stake constitutes an Estimated average Stake or manipulation thereof; the method comprising:
by a processor of the aggregation platform, with respect to each player of the plurality of players:
associating the player with a tokens balance comprising one or more tokens;
associating the player with a Features balance comprising one or more Features, the Features have been acquired by the player, wherein each Feature is associated with a respective Feature's stake value;
transmitting the associated tokens balance and the Features balance to the GPAS, and
repeatedly monitoring operation of the player, including:
in response to receipt from the at least one RGS or the GPAS data on game events generated in one or more of the plurality of games, continuously updating the tokens balance according to a predefined configuration;
receiving from the GPAS a selection by the player of a Feature from the list of available Features, wherein the Feature is operable in a given game;

updating the tokens balance, based on the selection, by degrading the number of the Feature's cost value;

wherein the updated tokens balance over a selected time interval or portion thereof constitutes a token balance trail;

determining a Feature's stake value of the selected Feature, based on the updated tokens balance trail and associating the selected Feature with the determined Feature's stake;

adding the selected Feature to the Feature's balance, thereby enabling operation of the selected Feature in the given game, according to the feature's stake;

transmitting the updated Feature's stake to the GPAS to be communicated to the player; and receiving, from the GPAS, data on activation of the selected Feature in the given game.

* * * * *